Oct. 2, 1962   H. L. BISHOP   3,056,348
PHOTOGRAPHER'S MAT
Filed Oct. 2, 1957

INVENTOR.
HOMER L. BISHOP
BY
HIS ATTORNEYS

United States Patent Office 3,056,348
Patented Oct. 2, 1962

3,056,348
PHOTOGRAPHER'S MAT
Homer L. Bishop, 4308 Ridgeway Road, Dayton 29, Ohio
Filed Oct. 2, 1957, Ser. No. 687,654
7 Claims. (Cl. 101—401.3)

This invention relates to a laminated mat of sheet material for use as an underlay in the photoengraving art.

This invention is an improvement upon the laminated mat disclosed in my United States Letters Patent No. 2,088,398, patented July 27, 1937, which patent discloses a mat for use in treating printing plates used as underlays and as overlays. The device disclosed in this patent has been used very extensively with printing plates either as overlays or underlays to emphasize various gradations in shading.

Photoengravers, who prepare the originals used in manufacturing the shells for electrotype plates, are quite desirous of pulling proofs from the originals that may be used in comparing the proofs of the originals with the proofs of the treated electrotype plates. The photoengraver, in producing the original, may be reproducing a picture in color, the colors representing the actual colors shown in the picture. The photoengraver finds it necessary to provide an underlay for controlling the intensity of the various colors used in reproducing the scene.

The original mat is not treated in such a manner that a permanent treatment is imparted to the original. Instead of putting treatment into the original like the treatment that is put into an electrotype plate, underlays are used to obtain gradations in shading, the underlay being thickest under the portion of the original that forms a dark area or the more solid color areas. In reproducing delicate tones, such as pastel shades, the underlay has cut-out areas underlying the areas having delicate colors. Likewise, high light areas are emphasized. One of the difficulties in pulling proofs from an original is the relative stiffness of the marginal portions of the original.

An object of this invention is to produce an underlay, wherein the marginal portions of the original have much less support than the area of the original that is used in reproducing the scene. This has been accomplished by providing a rather heavy sheet on the back side or the under side of the underlay, the margins of which are removed so that there is practically no support for the margins of the original.

Another object of this invention is to provide a system providing marks on the underlay and through the underlay to facilitate the making and the use of the underlay.

Other objects and advantages reside in the construction of parts, the combination thereof, the method of manufacture and the mode of operation, as will become more apparent from the following description.

Figure 1:
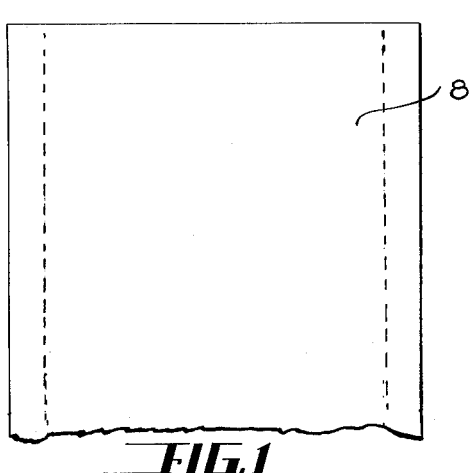
FIGURE 1 is a top plan view of a laminated sheet assembly before being cut to size, with parts broken away.

The laminated sheet assembly 8 consists of a plurality of layers of suitable paper sheets held together with a wax adhesive or bond, the strength of the adhesive or bond being less than the strength of the sheet material. This enables the photoengraver to make incisions around one or more of the layers and remove the portion of the layer either enclosed within the incision or located beyond the incision, depending upon the areas to be relieved and the areas to be built up. The assembly 8 is first cut to the desired size, as indicated by the dotted lines in FIGURE 1.

The assembly many consist of a base sheet 12 that may be .005 inch thick, generally referred to as a five point sheet. This base sheet 12 is preferably made from a material that is rather hard to cut, in that this sheet is not to be severed after it has been cut to the proper size. Underlying the base sheet 12 is a sheet 10 that may be .010 inch thick, generally referred to as a ten point sheet.

Superimposed upon this base sheet 12 may be one, two or three layers of sheet material. In the particular embodiment disclosed, there are three layers 14, 16 and 18. The sheets 14, 16 and 18 may be .0025 inch thick, generally referred to as a 2.5 point sheet. The thickness of the various layers may vary. For example, the bottom sheet 10 may be .010 inch thick, it may be .005 inch thick, or .008 inch thick, or any other suitable thickness. The thickness of the bottom sheet is governed in part by the type of printing press that is used in pulling a proof.

All of the layers 10, 12, 14, 16 and 18 are bonded together by a wax bonding material, so that the sheets may be readily separated from the base sheet 12 in any selected area or areas. For convenience, the several sheets or lamina may have different colors. For example, a top sheet or bottom sheet may be white. The base sheet 12 may be blue. The sheets 12, 14 and 16 may have different colors, as for example, orange, red or yellow, or any other suitable color combination. The reason for using various colors is to enable the operator to readily determine the number of layers that are being removed.

Method of Making the Underlay

Figure 2:
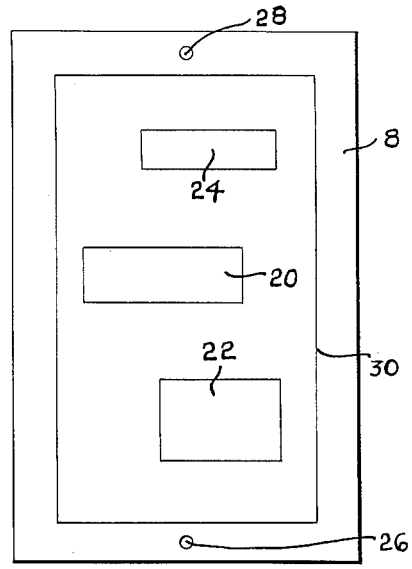
FIGURE 2 shows the laminated sheet assembly after the proof has been pulled on the original, the proof being used to indicate the areas that are to be reproduced.

A laminated sheet is first trimmed to the size of the original or the approximate size of the original. The first operation after trimming the laminated assembly to the desired size is to pull a proof on the laminated assembly. This proof may be referred to as an instruction proof to be used in making the underlay with the desired contour to properly emphasize gradations of shading. This may be done by placing the original on the bed of a press and placing the laminated assembly on the cylinder so as to pull a proof on the top layer 18 of the laminated assembly shown in FIGURE 2. For the purpose of illustration, the portions that are to be relieved under the original have been shown as rectangles 20, 22 and 24.

Two circular marks or areas 26 and 28 have been printed beyond the printing margin 30 of the original. Holes are punched through the circular areas 26 and 28. These are later to be used as registration holes, as will appear more fully later.

The bottom sheet 10 has its margins cut directly under the marginal line 30 of the proof. The material of the bottom sheet 10 lying beyond the marginal line 30 is removed bodily from the base sheet 12, so that the remaining portion of the sheet 10 underlies the portion within the margins 30 of the proof.

Figure 3:
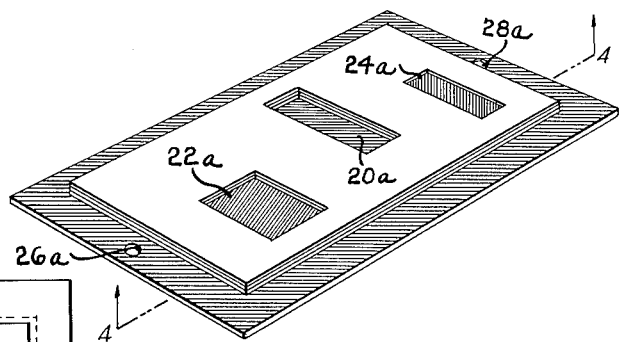
FIGURE 3 is a perspective view of the top side of the underlay, disclosing the side that is to be used in direct contact on the back side of the original when pulling a proof.

The succeeding operation consists of removing portions of the sheets 14, 16 and 18, so as to provide a proper relief under predeterminad areas of the original. In the illustration shown, three layers have to be removed under the area 20, two layers under the area 22 and one layer under the area 24. The resulting recesses will be indicated by the same numerals as used for the areas 20, 22 and 24, followed by the suffix a. By means of a sharp pointed knife or scalpel, incisions are made through the three top layers 18, 16 and 14 around the rectangular portion 20 and the three layers within this area are then removed bodily so as to provide a recess or hole 20a, as shown in FIGURE 3. This is followed by making an incision through two layers around the rectangular portion 22 and removing the two layers from this rectangular area, so as to provide a recess 22a. An incision around the rectangular portion 24 is made through the top layer or sheet 18 and the material removed from this rectangular area will provide a recess 24a. By this arrangement, various gradations of shading may be made in the proof, as will be described more fully later. For most purposes, only one or two layers or lamina are used on top of the base sheet 12, in that generally only one or two stages of depression are needed for pulling a proof.

In multi-color work there is usually a series of originals, one for the yellow, one for the red, one for the blue and one for the black, as is well known to those skilled in the art. Due to the fact that the gradations of shading may not be the same for various colors used, it is necessary to make an underlay for each of the originals. If the original consists of yellow, red, blue and black there would be one underlay for the yellow original, one underlay for the blue, one underlay for the red and one underlay for the black.

A series of proofs and combinations of proofs are pulled from the various originals and combination thereof. In pulling these proofs, the underlay is placed on the bed of the press. Short pins are passed through the holes 26a and 28a. There are corresponding holes in the original and in the bed of the press. The yellow original is then put in position overlying the underlay, the holes passing over the pins extending through the holes 26a and 28a, which pins are secured to the bed of the press. This is done in order to secure proper registry between the underlay and the original. A proof is then pulled of the yellow original. After removing the yellow original and the underlay of the yellow original from the bed, the underlay for the red original is then placed over the same pins. This is followed by the red original being superimposed upon the underlay for the red. Again, the pins extend through the holes in the original, so as to obtain proper registry. A proof is then pulled using the red original. The next proof is made by pulling a proof, utilizing the yellow original superimposed upon its underlay, followed by pulling a proof on the same proof sheet, utilizing the red original superimposed upon its underlay. These proofs also have holes corresponding in spacing to the spacing of the pins, so that the red and the yellow colors will be in registry. This may be followed by the same procedure used in the blue original superimposed upon its underlay. Then another proof is pulled, utilizing the yellow original over its underlay, followed by the red original superimposed upon its underlay and then adding to the proof the blue original superimposed upon its underlay. In other words, this proof will contain the yellow, the red and the blue, all in registry.

Finally, a proof is pulled of the black original superimposed upon its underlay, this being followed by a proof utilizing the yellow, the red, the blue and the black, each over its respective underlay. The proof pulled from the four color originals is compared with the scene from which the original is produced. In the event the contrast in certain portions of the proof is inaccurate, as for example, if the yellow is too strong in the area corresponding to the rectangular area 22a, it may be necessary to remove another layer in the areas where the yellow is too strong, so as to relieve the pressure. Then it will be necessary to pull a new series of proofs in the event an error has been made. On the other hand, if one of the colors is too faint in some area, it may be necessary to replace one layer that has been removed from this area. This can readily be done by placing the removed layer back in position exerting a pressure upon it and the waxed surfaces will cause this removed portion that has been reinserted to adhere in position. In other words, the wax bonding material functions similar to a pressure sensitive adhesive.

These proofs are generally referred to as a "book" that follows the original until the four electrotypes or plates have been produced, one for use with the yellow, one for use with the red, one for use with the blue and one for use with the black. These electrotype plates are treated by the use of the mats disclosed in my patent identified above. When a series of proofs are pulled from the several electrotypes, these proofs can be compared with a like series of proofs pulled from the originals, to ascertain the fidelity of reproduction of the electrotype plates. If the proofs obtained from the several electrotype plates for the multi-color series do not agree with the proofs in the book obtained from the originals, further treatment may be necessary, so as to insure proper reproduction.

Figure 4:
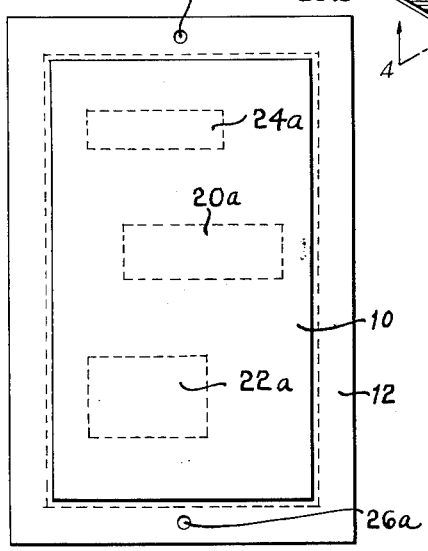
FIGURE 4 is a rear view of the underlay shown in FIGURE 3.
Figure 5:
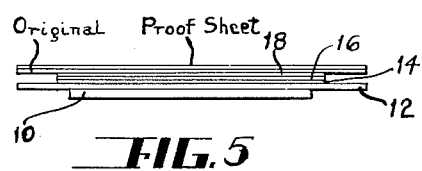
FIGURE 5 is an end view of the underlay in readiness for use.

By referring to FIGURES 3, 4 and 5, it can readily be seen that the sheet 10 underlying the base sheet 12 is smaller in size than the overlying sheets 14, 16 and 18. The overlying sheets support an original a short distance beyond the margin of the printing area 30, so as to print lines surrounding the printing area. However, the underlying sheet 14 is of a lesser area.

The purpose of the underlying sheet 10 is to reduce the support for the marginal portions of the original. Without the use of the sheet 10, the stiffness of the marginal portions of the original is such that it would not give adequate flexibility to the original within the area that is to be produced with high fidelity. The crux of the invention resides in the use of a sheet 10 underlying the base sheet, the sheet 10 being thicker than the laminations overlying the base sheet, to thereby release or remove in part the support of the marginal portions of the original. The marginal portions of the original correspond to the dead metal portions of the electrotype plate surrounding the printing area.

Although the preferred embodiment of the device has been described, it will be understood that within the purview of this invention various change may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An underlay for use in pulling proofs from an original, said underlay having a base sheet, at least one sheet superimposed upon the base sheet and held to the base sheet by a bonding material that is weaker than the superimposed sheet and the base sheet, said superimposed sheet having portions removed to reduce the thickness of the underlay in those areas where portions are removed, the improvement in the underlay consisting of a sheet underlying the base sheet, the sheet underlying the base sheet being secured thereto by an adhesive or bonding material having less strength than the underlying sheet and the base sheet, said underlying sheet having no marginal portions extending beyond the printing area of the original, whereas the margins of the other sheets project beyond the printing area, the thickness of the underlying sheet being greater than the thickness of the superimposed sheet so as to provide less thickness in the underlay lying under the marginal portions of the original than under other portions of the original.

2. An underlay for use in pulling proofs from an original, said underlay having a base sheet, at least one sheet superimposed upon the base sheet and held to the base sheet by a bonding material that is weaker than the superimposed sheet and the base sheet, said superimposed sheet having portions removed to reduce the thickness of the underlay in those areas where portions are removed, the base sheet having at least two registration holes therein, one in each end, the improvement in the underlay consisting of a sheet underlying the base sheet, the thickness of this underlying sheet being greater than the thickness of the superimposed sheet, the sheet underlying the base sheet being secured thereto by an adhesive or bonding material having less strength than the underlying sheet and the base sheet, said underlying sheet having no marginal portions extending beyond the printing area of the original whereas the margins of the other sheets project beyond the printing area so as to provide less thickness under the marginal portions of the original than under other portions.

3. An underlay according to claim 2 wherein the sheet superimposed on said base sheet is covered with a second sheet superimposed thereon and bonded thereto by a bonding material having less strength than the successively superimposed sheets.

4. An underlay for use by photoengravers in pulling proofs from an original, said underlay comprising a base sheet, a sheet underlying the base sheet, and at least one sheet superimposed upon the base sheet, the several sheets being secured together by a bonding material that is weaker than the sheets whereby portions of the sheets may be removed bodily from the base sheet, the base sheet being tougher to cut than the other sheets, the margins of the underlying sheet corresponding with the margins of the printing area of the original, the sheet superimposed upon the base sheet having areas removed corresponding to the high light areas of the original, and the margins of the base sheet and superimposed sheet projecting beyond the margins of the underlying sheet.

5. An underlay according to claim 4, wherein the base sheet is thinner than the underlying sheet and thicker than the superimposed sheet.

6. The method of pulling a proof from an original including the steps of producing an underlay including the steps of superimposing at least one sheet upon a base sheet, applying a sheet on the under side of the base sheet, securing the sheets together with a bonding material that fails more easily than the sheets, pulling a proof from the original upon the exposed surface of the superimposed sheet, removing portions of the superimposed sheet underlying the high light areas of the original, trimming the margins of the underlying sheet to the size of the printing area of the original, and removing the trimmed margins, the remaining portions of the underlying sheet having the same dimensions as the printing surface of the original, placing the original over the underlay, and printing a proof from the original upon the proof sheet.

7. The method of pulling a proof from an original according to claim 6, wherein two or more sheets are superimposed upon the base sheet, some of the removed portions being removed from both of the superimposed sheets for emphasis of the high light areas and some of the removed portions being removed only from the top superimposed sheet for emphasizing gradations of shading between the high light areas and the dark areas.

References Cited in the file of this patent

UNITED STATES PATENTS

| | | |
|---|---|---|
| 639,207 | Abelmann | Dec. 19, 1899 |
| 1,545,958 | Greenway | July 14, 1925 |
| 2,088,398 | Bishop | July 27, 1937 |
| 2,088,399 | Gibson | July 27, 1937 |
| 2,405,749 | Kern | Aug. 13, 1946 |
| 2,656,790 | Reilly | Oct. 27, 1953 |
| 2,704,977 | Reilly | Mar. 29, 1955 |

FOREIGN PATENTS

| | | |
|---|---|---|
| 36,991 | Austria | Apr. 26, 1909 |